Oct. 12, 1954

O. L. MacSORLEY 2,691,733

AUTOMATIC FREQUENCY CONTROL

Filed Feb. 28, 1951

INVENTOR
Olin L. MacSorley
BY
Conder C. Henry
ATTORNEY

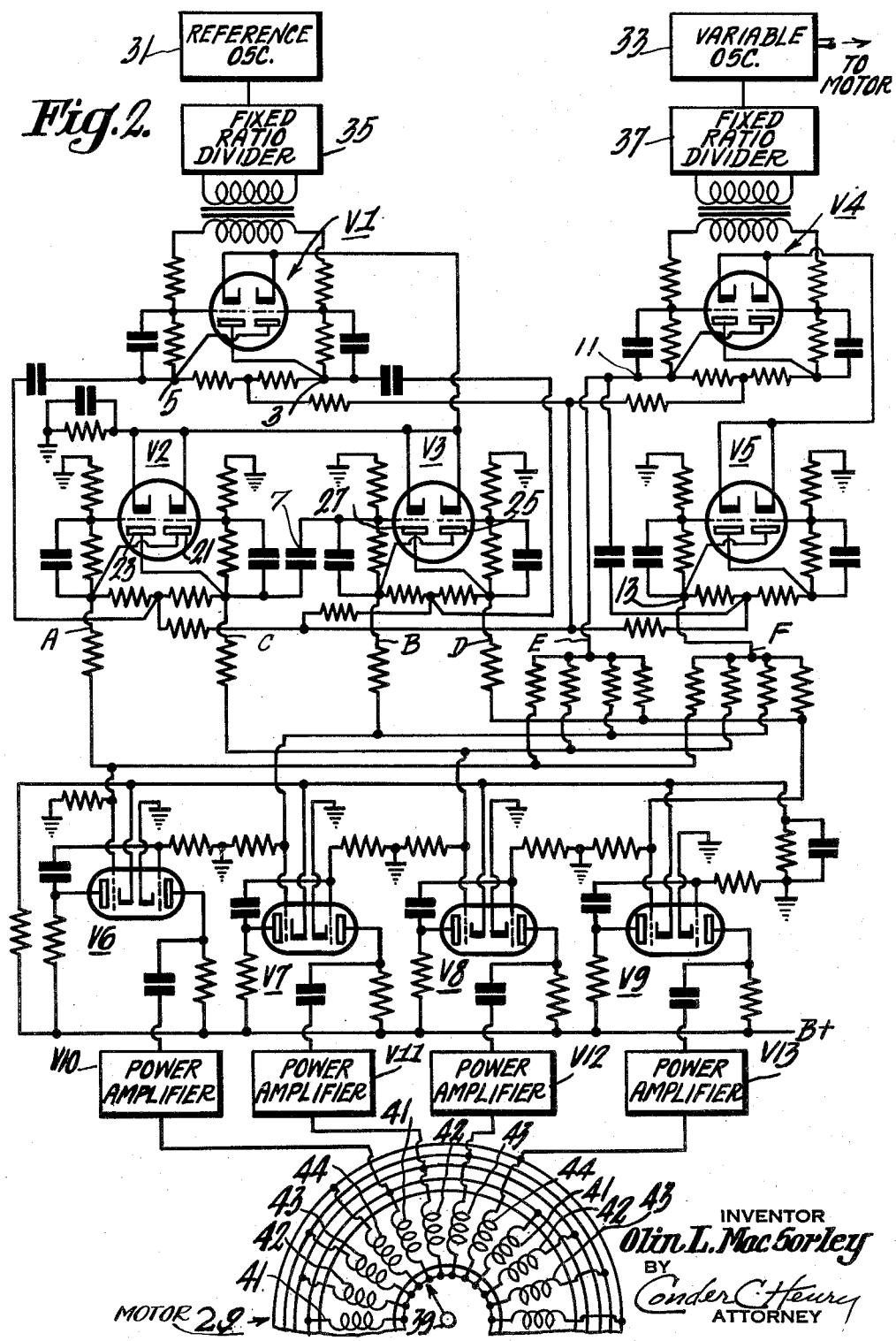

Oct. 12, 1954

O. L. MacSORLEY 2,691,733

AUTOMATIC FREQUENCY CONTROL

Filed Feb. 28, 1951

INVENTOR
Olin L. MacSorley
BY
Conder C. Henry
ATTORNEY

Oct. 12, 1954     O. L. MacSORLEY     2,691,733
AUTOMATIC FREQUENCY CONTROL
Filed Feb. 28, 1951     5 Sheets-Sheet 4

INVENTOR
Olin L. MacSorley
BY
Conder C. Henry
ATTORNEY

Oct. 12, 1954     O. L. MacSORLEY     2,691,733
AUTOMATIC FREQUENCY CONTROL
Filed Feb. 28, 1951     5 Sheets-Sheet 5
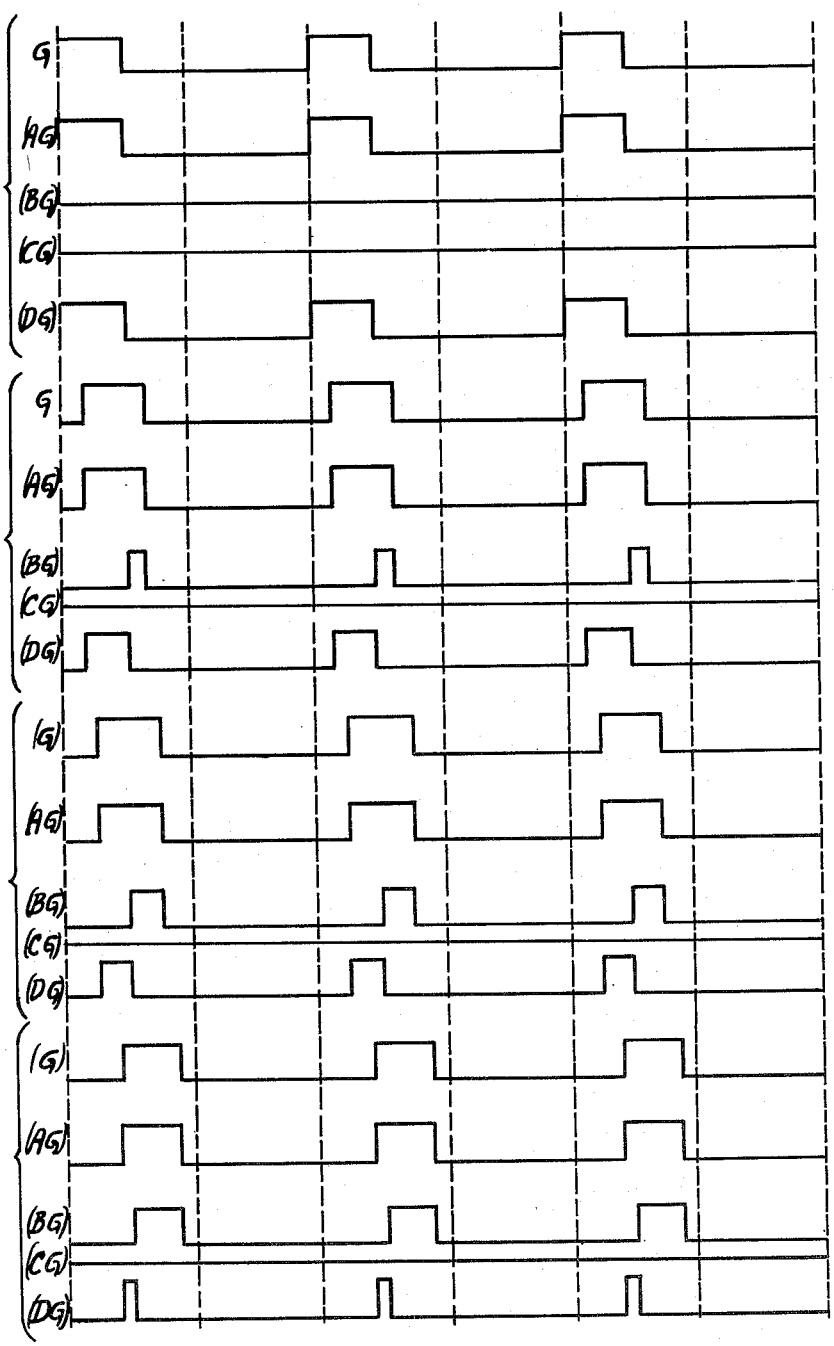
INVENTOR
Olin L. MacSorley
BY
Conder C. Henry
ATTORNEY

Patented Oct. 12, 1954

2,691,733

UNITED STATES PATENT OFFICE 2,691,733

AUTOMATIC FREQUENCY CONTROL

Olin L. MacSorley, Collingswood, N. J., assignor to Radio Corporation of America, a corporation of Delaware Application February 28, 1951, Serial No. 213,230

12 Claims. (Cl. 250—36)

The present invention relates to a method and apparatus for providing automatic frequency and phase control in electrical apparatus.

My invention provides a wide range of frequency control from low frequencies up through radio frequencies, such as is normally allowed by a frequency discriminator, and at the same time permits accurate positioning for the final lock-in between the reference frequency and variable frequency, such as is normally provided by a phase discriminator. According to my invention, a reference frequency voltage and a voltage of a variable frequency or phase with respect to the reference frequency are passed through separate channels from which control voltages are derived. The control voltages affect the frequency of the variable source in a manner that depends upon the relationship between the reference and variable voltages.

Accordingly, the main object of my invention is to provide a novel method and apparatus for maintaining automatic frequency control of a variable frequency source.

Another object of my invention is to provide a method and means for controlling the position of a motor rotor by the phase difference between two signals of the same frequency.

A further object is to provide a method and means for controlling the direction and rate of movement of a motor rotor by the difference in frequency between two signals.

A still further object is to provide an automatic frequency or phase control system which will operate over a wide range of frequencies with a high degree of accuracy.

The invention will be described with continuous reference to the accompanying drawings in which:

Fig. 2 is a combination block and circuit diagram of my invention;

Figure 1:
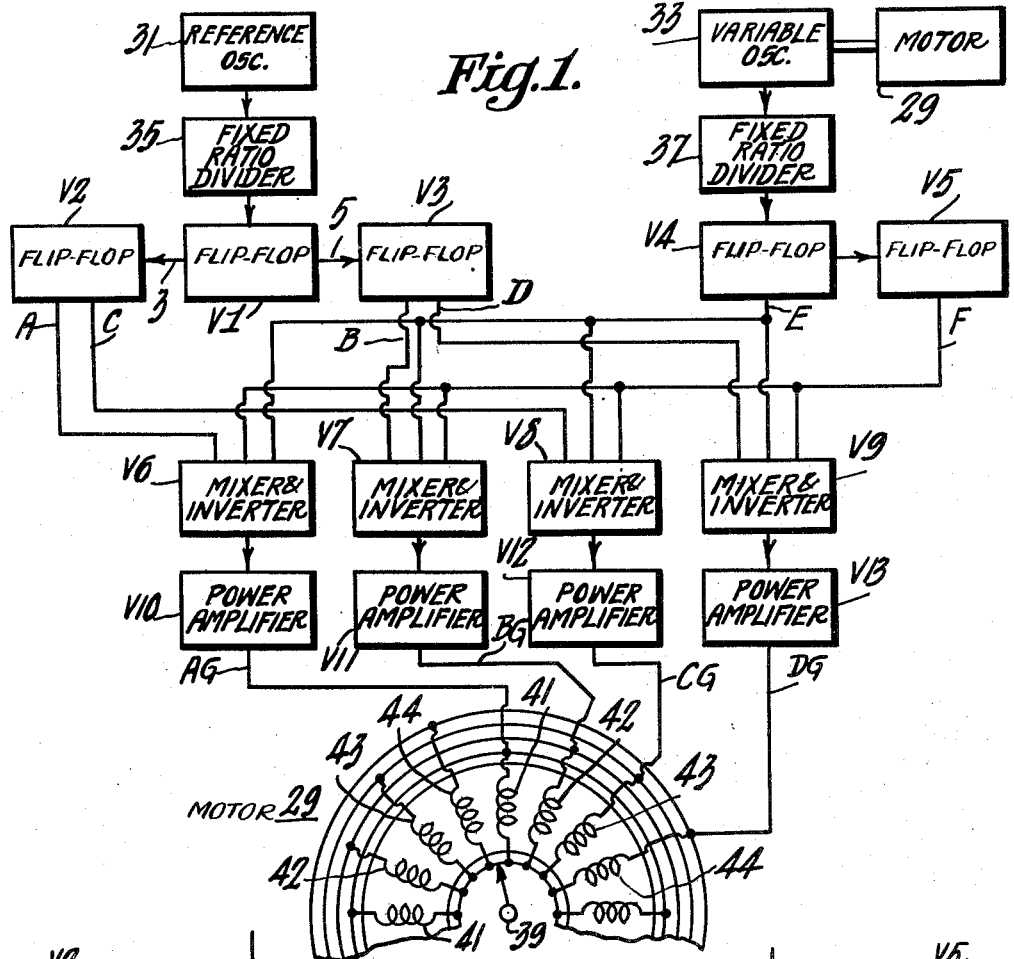
Fig. 1 is a block diagram of a circuit embodying my invention.
Figure 3:
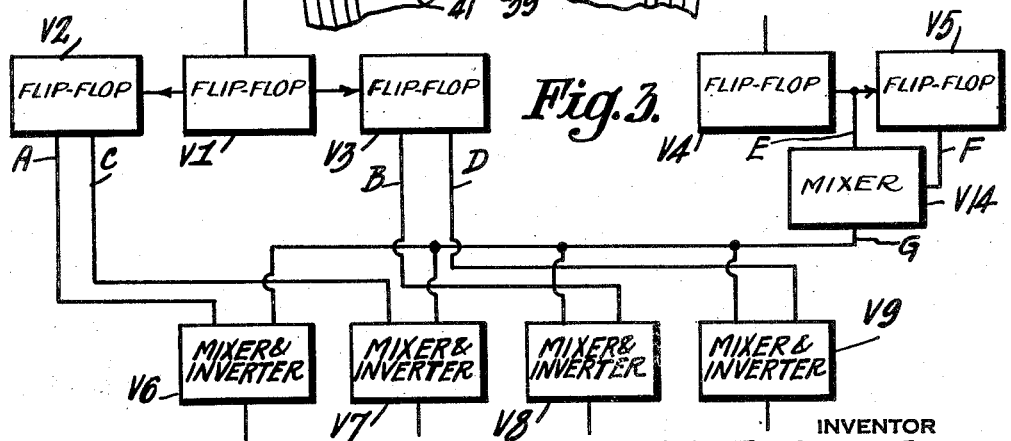
Fig. 3 is a block diagram of another embodiment of my invention.

Figs. 4, 5, 6, 7, 8, and 9 are curves of the voltages that appear at various points in my system as illustrated by Figs. 1, 2, and 3.

Referring to drawings there is shown a system according to my invention which utilizes two sources of voltage, one of which is a standard or reference frequency derived from a frequency source 31 in the form of an oscillator and the other of which is a variable frequency to be controlled, derived from the frequency source 33. The frequency source 33 to be controlled is adjusted by any known means, such as a variable inductor or capacitor which is operated by a motor 29 driven from the output of my system. The input frequencies, consisting of the reference frequency and the variable frequency may be sine waves, though such a wave form is not essential. Square waves or pulses could be used by making minor circuit modifications.

As shown in Figs. 1 and 2 the reference frequency is applied from the frequency source 31 through a fixed ratio divider 35 to a circuit element V1. The fixed ratio divider is used merely to reduce the oscillator frequency from the frequency source 31 to a frequency that can be utilized by the motor, thus allowing operation of the system in both the audio and radio frequency ranges. The circuit element V1 is a controlled flip-flop circuit operating in a well known manner and therefore, it will not be further described. The outputs, 3 and 5, from each side of the circuit element V1, are used to drive two other flip-flop circuits represented by tubes V2 and V3. By taking voltages from the plates 21, 23, 25 and 27 of such tubes, voltage waveforms illustrated by the curves designated A, C, B and D, respectively, in Figs. 4 and 5 are obtained.

The variable frequency from the frequency source 33 is also applied through a fixed ratio divider 37 to a tube V4 which is also a flip-flop circuit and which drives a second flip-flop circuit V5. The output 11 from the tube V4 and the output 13 from the tube V5 are represented by the curves E and F illustrated by Figs. 4 and 5. The voltages A, B, C, and D from the tubes V2 and V3 are then individually mixed with the voltages from the tubes V4 and V5. Two ways of mixing are disclosed.

One system of mixing the voltages comprises individually feeding the unmixed voltages E and F from the tubes V4 and V5, respectively, to each of several mixer and inverter stages V6, V7, V8 and V9. The voltages represented by the reference characters A and C from the tube V2 are respectively fed to conventional mixer and inverter stages V6 and V8 and the voltages represented by the reference characters B and D are respectively fed to conventional mixer and inverter stages V7 and V9. By this arrangement, the wave forms AEF, BEF, CEF, and DEF illustrated by Fig. 4 appear in the input to mixer and inverter stages V6, V7, V8 and V9.

Figure 4:
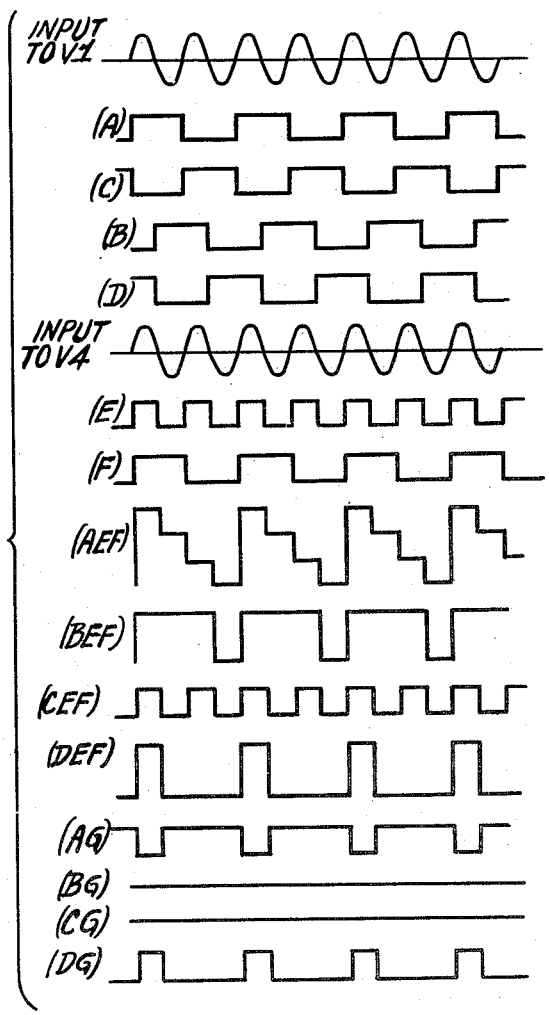
Figure 5:
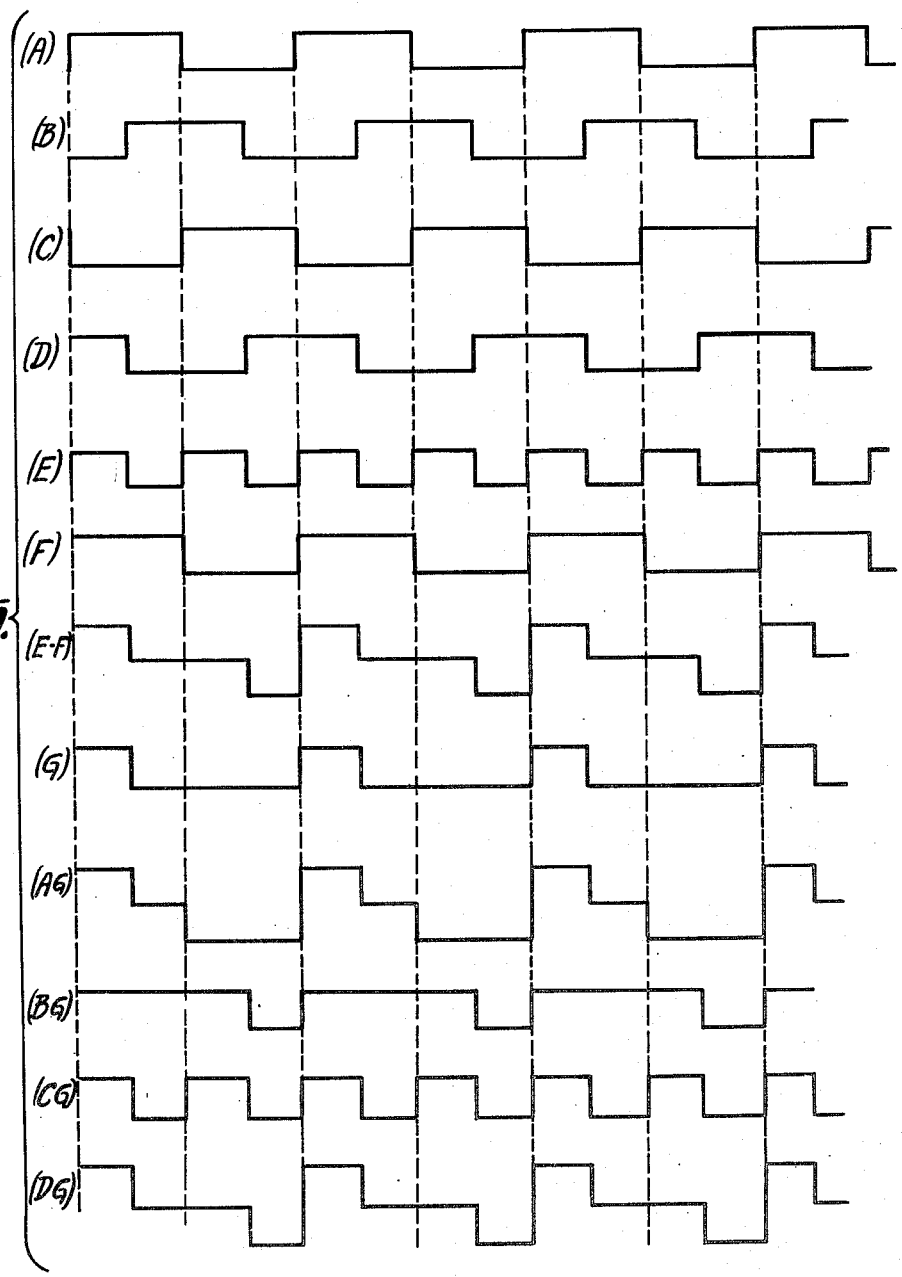

The outputs of the mixer and inverter stages V6, V7, V8 and V9 are represented by the wave forms AG, BG, CG and DG, respectively, as illustrated by Fig. 4. The voltages represented by these wave forms are amplified in power amplifiers V10, V11, V12, and V13, respectively, and are then applied to the field coils of a multiple pole motor 29 which controls the variable impedance in the variable frequency source 33.

As shown in Figs. 1 and 2, the voltage output from each power amplifier is applied to a separate field coil of the multiple pole motor 29 and the current waveforms in such coils will be the same as the wave forms represented by AG, BG, CG, DG in Fig. 4. It can thus be seen that the coils designated by the reference numerals 41 and 44 will have the same average field current, while the coils represented by the reference numerals 42 and 43 will have no current. Thus the rotor 39 of motor 29 will position itself midway between the coils 41 and 44.

Assume now that the relationship between the reference frequency voltage and the variable frequency voltage, is changing in phase or frequency from the relationship previously described, then the result of mixing the voltages represented by the waveforms AEF, BEF, CEF and DEF will produce voltages represented by waveforms AG, BG, CG and DG as shown in Fig. 7. For this condition the fields caused by the voltages applied to the coils 41 and 44 are no longer equal and do not balance each other and there is a slight field due to coil 42. The field of coil 41, being stronger causes the rotor of the motor to rotate toward such coil, thus correcting the frequency of the variable frequency system. In Figs. 8 and 9 there are illustrated the conditions of the voltages at later instants.

By continuing the same method of analysis, it can be shown that, as long as the two voltages are not the same in frequency, the phase relationship between the two voltages will continue to vary and, since the position of the rotor is determined by such phase relationship, the rotor will continue to turn. When the frequencies are the same the rotor will stop. When the rotor is turning, the direction of rotation is determined by whether the variable frequency is above or below the reference frequency.

To insure that the rotation will always be in the same direction for the same relationship between the frequencies, it is necessary to have a connection between tubes V2 and V3 to keep them in the correct phase relationship to each other. For the circuit shown in Figs. 1, 2, and 3 this consists of the capacitor 7 from the plate of tube V2 to the grid of tube V3.

The operation of the mixers and inverters V6, V7, V8 and V9 shown in detail in Fig. 2, is the same for each and a description of one will suffice for all. The voltages represented by A, E and F are mixed at the grid on one side of the two-part tube V6, which tube is arranged to conduct only when the voltages applied are all positive at the same time. Thus the voltage at the plate of the first half of tube V6 would be the inverse of that shown as AG of Fig. 4. This is inverted in the second half of V6 which results in a voltage similar to that shown as AG of Fig. 4. In the same way BEF, CEF and DEF are mixed at the grids of V7, V8, and V9 respectively and BG, CG, and DG result.

In another embodiment of my invention as shown in Fig. 3, the voltages represented by the waveforms A, B, C, D, E and F are developed in the same manner as described above. However, the voltage represented by the waveform designated as E from tube V4 and the voltage represented by the waveform designated as F from tube V5 are first mixed in a mixer stage V14 as the wave form designated E—F in Fig. 5. The output of the mixer V14 is the voltage represented by the waveform G in Figs. 5, 6, 7, 8 and 9. Such voltage is then mixed individually with the voltage waveforms represented as A and C from the tube V2 and B and D from the tube V3 in the mixer and inverter stages designated as V6, V7, V8 and V9 respectively. The remainder of the structure and operation are the same as described above with reference to Figs. 1 and 2.

It is to be understood that the particular embodiment shown is not the only possible system of operation and that the reference frequency and variable frequency sources may be interchanged so that the variable source feeds into the transmission channel headed by fixed ratio divider 35 and the reference source feeds into the transmission channel headed by fixed ratio divider 37. Therefore, in the claims, where a source feeds into a transmission channel, such source may be either the reference or variable.

What I claim is:

1. An automatic frequency control apparatus comprising a source of reference voltage of fixed frequency and a source of variable frequency voltage, means deriving a plurality of differently phased fixed control voltages from said reference voltage, means deriving a plurality of differently phased variable control voltages from said variable frequency voltage, separate mixing means for each of said fixed control voltages, means feeding said fixed control voltages respectively to said mixing means, and means effectively coupling each of said variable control voltages to each of said mixing means, a device connected to said variable source for controlling its frequency, the outputs of said mixing means being coupled to said device whereby said device is rendered operable when the frequency difference between said reference and variable frequency voltages departs from a predetermined frequency.

2. Apparatus as set forth in claim 1 wherein said device for controlling the frequency of said variable source comprises a multiple pole motor, the outputs of said mixing means being applied to the field coils of said multiple pole motor whereby said motor is rendered operable when the frequency difference between said reference and variable frequency voltages departs from a predetermined frequency.

3. Apparatus as set forth in claim 1 wherein said means for deriving said differently phased fixed control voltages and variable control voltages from said reference voltage and variable frequency voltage comprises a plurality of flip-flop circuits.

4. Apparatus as set forth in claim 2 wherein said means for deriving said differently phased fixed control voltages and variable control voltages from said reference voltage and variable frequency voltage comprises a plurality of flip-flop circuits.

5. An automatic frequency control apparatus comprising a source of reference voltage of fixed frequency and a source of variable frequency voltage, means deriving a plurality of differently phased fixed control voltages from said reference voltage, means deriving a plurality of differently phased variable control voltages from said variable frequency voltage, separate mixing means for each of said fixed control voltages, means feeding said fixed control voltages respectively to said mixing means, and means feeding each of said variable control voltages to each of said mixing means, a device connected to said variable source for controlling its frequency, the outputs of said mixing means being coupled to said device whereby said device is rendered operable when the frequency difference between said reference and variable frequency voltages departs from a predetermined frequency.

6. Apparatus as set forth in claim 5 wherein said device for controlling the frequency of said variable source comprises a multiple pole motor, the outputs of said mixing means being applied to the field coils of said multiple pole motor whereby said motor is rendered operable when the frequency difference between said reference and variable frequency voltages departs from a predetermined frequency.

7. Apparatus as set forth in claim 5 wherein said means for deriving said differently phased fixed control voltages and variable control voltages from said reference voltage and variable frequency voltage comprises a plurality of flip-flop circuits.

8. Apparatus as set forth in claim 6 wherein said means for deriving said differently phased fixed control voltages and variable control voltages from said reference voltage and variable frequency voltage comprises a plurality of flip-flop circuits.

9. An automatic frequency control apparatus comprising a source of reference voltage of fixed frequency and a source of variable frequency voltage, means deriving a plurality of differently phased fixed control voltages from said reference voltage, means deriving a plurality of differently phased variable control voltages from said variable frequency voltage, means combining said variable control voltages into a single variable resultant voltage, separate mixing means for each of said fixed control voltages, means feeding said fixed control voltages respectively to said mixing means, and means feeding said single variable resultant voltage to each of said mixing means, a device connected to said variable source for controlling its frequency, the outputs of said mixing means being coupled to said device whereby said device is rendered operable when the frequency difference between said reference and variable frequency voltages departs from a predetermined frequency.

10. Apparatus as set forth in claim 9 wherein said device for controlling the frequency of said variable source comprises a multiple pole motor, the outputs of said mixing means being applied to the field coils of said multiple pole motor whereby said motor is rendered operable when the frequency difference between said reference and variable frequency voltages departs from a predetermined frequency.

11. Apparatus as set forth in claim 9 wherein said means for deriving said differently phased fixed control voltages and variable control voltages from said reference voltage and variable frequency voltage comprises a plurality of flip-flop circuits.

12. Apparatus as set forth in claim 10 wherein said means for deriving said differently phased fixed control voltages and variable control voltages from said reference voltage and variable frequency voltage comprises a plurality of flip-flop circuits.

References Cited in the file of this patent

UNITED STATES PATENTS

| Number | Name | Date |
| --- | --- | --- |
| 2,503,105 | Freas | Apr. 4, 1950 |
| 2,511,137 | Wheeler | June 13, 1950 |
| 2,516,308 | Forrester | July 25, 1950 |
| 2,540,139 | Ranger | Feb. 6, 1951 |
| 2,543,058 | Ranger | Feb. 27, 1951 |